No. 694,364. Patented Mar. 4, 1902.
J. M. FRACHEBOURG.
SHUTTER FOR COLOR PHOTOGRAPHY.
(Application filed Nov. 22, 1900.)
(No Model.)
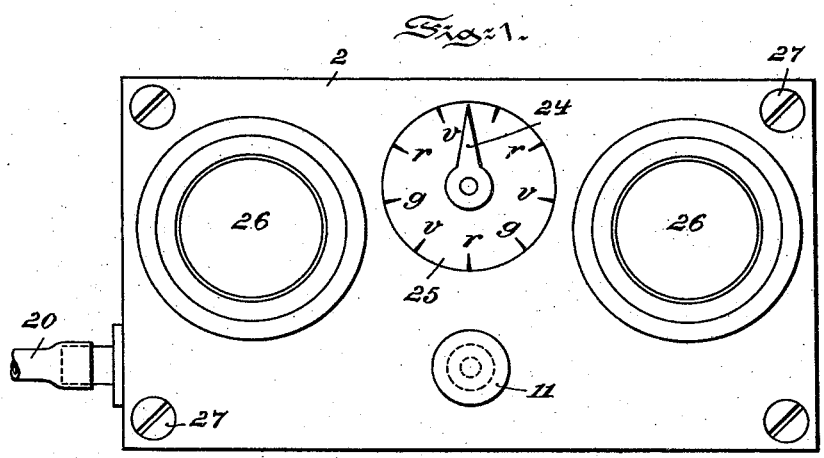
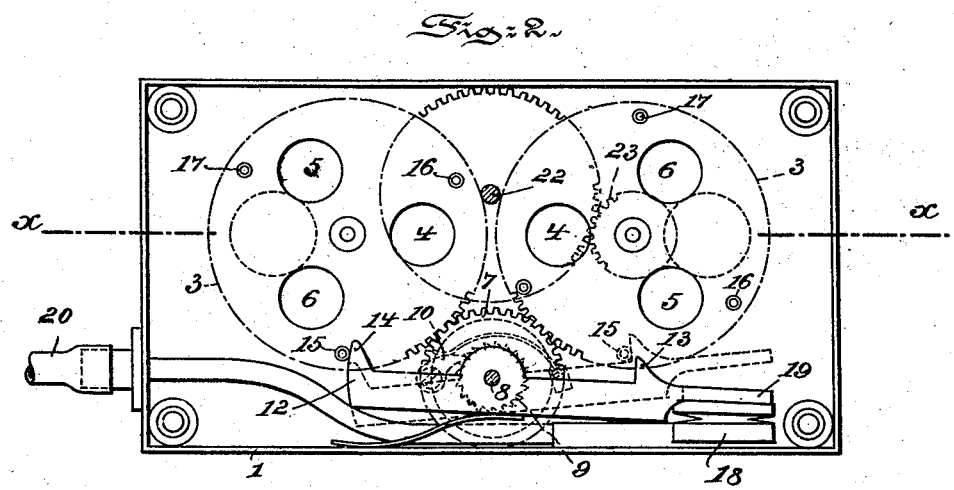
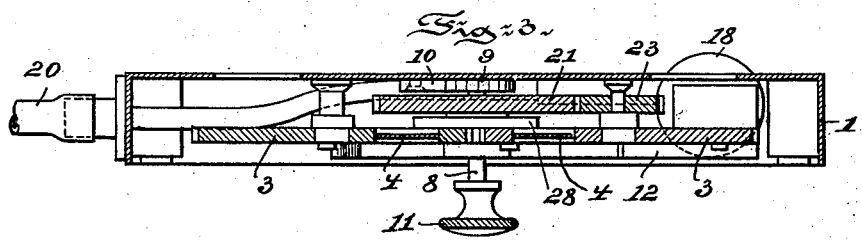
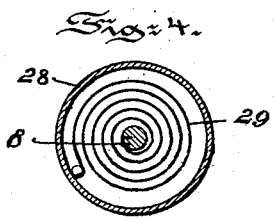
Witnesses:
Thomas M. Smith
Henry E. Everding
Inventor:
Jean M. Frachebourg
By J. Walter Douglas
Attorney

UNITED STATES PATENT OFFICE.

JEAN MARIE FRACHEBOURG, OF PARIS, FRANCE.

SHUTTER FOR COLOR PHOTOGRAPHY.

SPECIFICATION forming part of Letters Patent No. 694,364, dated March 4, 1902.

Application filed November 22, 1900. Serial No. 37,322. (No model.)

*To all whom it may concern:*

Be it known that I, JEAN MARIE FRACHEBOURG, a citizen of the Republic of France, residing at Paris, France, have invented certain new and useful Improvements in Shutters for Color Photography, of which the following is a specification.

My invention has relation to a shutter adapted for use in photographic apparatus applicable to color photography, and in such connection it relates to the construction and arrangement of such a shutter.

The principal object of my invention is to provide a shutter-disk carrying a series of color-screens and adapted to be mechanically rotated to bring each screen successively in front of the lens of the camera to thereby avoid the necessity of employing independent screens adjusted by hand and to lessen the time of the sitting or pose, which in color photography has been the great disadvantage in the successful reproductions of the object photographed.

The nature and scope of my invention will be more fully understood from the following description, taken in connection with the accompanying drawings, forming part hereof, in which—

Figure 1 is a front elevational view of the box containing the screen or shutter mechanism embodying main features of my invention, the box also supporting the stereoscopic lenses and the indicator for showing the position of the color-screens of the shutter-disk. Fig. 2 is a view similar to Fig. 1, but with the front plate removed to expose the shutters and their operating mechanism. Fig. 3 is a longitudinal sectional view taken on the line $x\,x$ of Fig. 2; and Fig. 4 is a sectional view, enlarged, illustrating the interior of the spring-barrel.

Referring to the drawings, 1 represents the box, within which the operating mechanism for the shutter-disks is inclosed. 2 is the cover for said box, and 3 are the toothed shutter-disks, each provided with three openings 4, 5, and 6, covered by colored screens, preferably red, yellow, and violet. These screens are so arranged upon the disks that as the disks rotate two screens of the same color come simultaneously and automatically opposite the two lenses of the camera. A toothed wheel 7 is mounted upon a spindle 8 and gears with the toothed disks 3. Upon the under face of the toothed wheel 7 is arranged a ratchet-wheel 9, engaged by the pawl 10, and between the toothed wheel 7 and the ratchet-wheel 9 is interposed a spring-barrel 28, the spring 29 of which is adapted to be wound up when necessary by the milled head 11, secured to the spindle 8. The spring-barrel 28 drives the toothed wheel 7 and the two disks 3. A lever 12 is pivoted to the spindle 8 of the toothed wheel 7 intermediate of its ends, which ends are provided with abutment-pieces 13 and 14. In the normal position of the lever 12, illustrated in Fig. 2, the spring being wound up the abutment-piece 14 stops the mechanism by engaging the pin or stop 15 on one of the screen-disks or shutters 3, each disk being provided with three pins or stops 15, 16, and 17, corresponding to each screen. A bellows 18, of rubber or other suitable material, is normally closed under spring tension, and upon it rests a prolongation 19 of the end of the lever 12. A rubber tube 20 connects the bellows 18 with a pneumatic bulb or ball (not shown) in such a manner that when the bulb or ball is squeezed air will be forced through the tube 20 to expand the bellows 18. A toothed wheel 21, mounted upon a spindle 22, gears with a pinion 23, situated, preferably, beneath the left-hand toothed screen-disk or shutter 3, and serves to drive an index-finger 24 when the disks 3 are rotated. The index-finger 24 travels over a dial 25 to indicate upon said dial the color of the screens between the lenses and the negative. The dial 25 is divided, by preference, into nine divisions marked r, g and v; r, g and v; and r, g and v. The divisions r correspond with the screens 4, which are red, the divisions g correspond with the green screens 5, and the divisions v correspond with the violet screens 6. The lenses 26 are of the universal-focus type. The box-cover 2 may be secured to the box 1 by screws 27, or by any other suitable means.

The mechanism for operating the screen-shutters operates as follows: Pressure exerted upon the pneumatic ball by the operator when the apparatus is in place inflates the bellows 18, which causes the lever 12 to oscillate in such a manner that the abutment-piece 14 comes out of engagement with the stop 15 of the right-hand disk, which no longer being held allows the screen-disk to revolve a distance corresponding to half the distance separating the stops from each other, for the stop 15 on the left-hand disk strikes against the abutment 13 of the lever. The lever remains in the position indicated by dots during the pose, the screens 5 5 being in front of the lenses. When pressure is no longer exerted upon the pneumatic ball, the lever resumes the normal position by the action of the spring 28. The stop 17 on the right-hand disk strikes against the end 14 of the lever. The apparatus is now cut off from the light, the solid portions of the disk being in front of the lenses. The apparatus then works in the same way until the end of the pose—that is to say, until the three screens have passed in front of the lens.

Having thus described the nature and object of my invention, what I claim as new, and desire to secure by Letters Patent, is—

1. In an apparatus for color photography, a shutter comprising a disk having a notched or toothed periphery and provided with three openings adapted to successively register with the lens, screens of varying colors adapted to cover said openings, a gear-wheel adapted to mesh with the toothed periphery of the disk and means for periodically driving said gear-wheel to bring each color-screen successively between the lens and plate.

2. In a stereoscopic apparatus for color photography provided with two universal-focus lenses, two shutters each comprising a disk provided with openings, a color-screen covering each opening, said openings and screens in one disk arranged to correspond with the openings and screens in the other disk, and means for rotating both disks to bring corresponding screens simultaneously in alinement with the lenses of the apparatus, substantially as and for the purposes described.

3. In a stereoscopic apparatus for color photography provided with two universal-focus lenses, two shutters each consisting of a toothed disk provided with openings, a color-screen covering each opening, a gear mechanism in mesh with both disks and adapted to rotate the same simultaneously and means for periodically actuating said gear mechanism to bring corresponding color-screens of the disks in alinement with the lenses, substantially as and for the purposes described.

4. In an apparatus for color photography, a disk having a series of openings, each opening covered by a screen, the color of which is different from that of the other screens, means for automatically rotating said disk, and an indicator adapted to indicate the relative position of the color-screens with respect to the lens of the apparatus, substantially as and for the purposes described.

In testimony whereof I have signed this specification in the presence of two subscribing witnesses.

JEAN MARIE FRACHEBOURG.

Witnesses:
PAUL DE MESTSAL,
J. ALLISON BOWEN.